(12) United States Patent
Flammann (10) Patent No.: US 10,618,747 B2
(45) Date of Patent: Apr. 14, 2020

(54) METHOD AND APPARATUS FOR THE GROUPED ARRANGEMENT, ORIENTATION AND PACKAGING OF INDIVIDUAL FOOD PRODUCTS SUCH AS PATTY STACKS

(71) Applicant: VEMAG Maschinenbau GmbH, Verden/Aller (DE)

(72) Inventor: Uwe Flammann, Kirchlinteln (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 0 days.

(21) Appl. No.: 15/906,439

(22) Filed: Feb. 27, 2018

(65) Prior Publication Data

US 2019/0077610 A1   Mar. 14, 2019

(30) Foreign Application Priority Data

Sep. 8, 2017 (DE) .................. 10 2017 120 823

(51) Int. Cl.
*B65G 47/71* (2006.01)
*B65G 57/11* (2006.01)
(Continued)

(52) U.S. Cl.
CPC ............ *B65G 47/715* (2013.01); *B65B 5/068* (2013.01); *B65B 25/065* (2013.01); *B65B 35/44* (2013.01);
(Continued)

(58) Field of Classification Search
CPC .... B65G 47/715; B65G 47/24; B65G 47/642; B65G 57/00; B65G 57/11
(Continued)

(56) References Cited

U.S. PATENT DOCUMENTS

| | | | | |
|---|---|---|---|---|
| 3,525,443 A | * | 8/1970 | Pomara, Jr. | B65B 35/50 414/788.9 |
| 3,550,749 A | * | 12/1970 | Story | B65G 47/086 198/431 |
| 3,866,741 A | | 2/1975 | Carbon et al. | |
| 4,026,421 A | | 5/1977 | Lotz | |

(Continued)

FOREIGN PATENT DOCUMENTS

| | | |
|---|---|---|
| DE | 1956474 A1 | 5/1971 |
| EP | 0082123 A2 | 6/1983 |

(Continued)

OTHER PUBLICATIONS

European Patent Office, Search Report issued in EP 18193286.4-1017 dated Feb. 4, 2019 (4 pages).

*Primary Examiner* — William R Harp
(74) *Attorney, Agent, or Firm* — Wood Herron & Evans LLP (57) ABSTRACT

A method and an apparatus are provided for the grouped arrangement, orientation and packaging of stacked food products like patty stacks. The method includes feeding a food product by a first feed belt in the direction of a first X-axis, and then ejecting the food product onto a second feed belt to form stacked food products. The method also includes transporting the stacked food products by the second feed belt along a Y-axis generally perpendicular to the X-axis and in the direction of an orientation mask which is arranged above the second feed belt. The stacked food products are oriented by contacting the orientation mask. The oriented food products may therefore be grouped together in oriented rows for packaging when further moved along the Y-axis by the second feed belt. The method and apparatus enable rapid orienting of various types of food products that are typically stacked and packaged.

16 Claims, 6 Drawing Sheets

(51) Int. Cl.
  *B65B 35/44* (2006.01)
  *B65B 25/06* (2006.01)
  *B65B 5/06* (2006.01)
  *B65B 35/50* (2006.01)
  *B65G 47/24* (2006.01)
  *B65G 47/08* (2006.01)
  *B65G 47/22* (2006.01)
  *B65B 35/24* (2006.01)

(52) U.S. Cl.
  CPC .............. *B65B 35/50* (2013.01); *B65G 47/24* (2013.01); *B65G 57/11* (2013.01); *B65B 35/246* (2013.01); *B65G 47/088* (2013.01); *B65G 47/22* (2013.01); *B65G 2201/0202* (2013.01)

(58) Field of Classification Search
  USPC .............................................. 198/431, 418.6
  See application file for complete search history.

(56) References Cited

U.S. PATENT DOCUMENTS

| | | | | |
|---|---|---|---|---|
| 4,034,846 | A | * | 7/1977 | Burgis ................... B65G 57/00 198/431 |
| 4,530,632 | A | * | 7/1985 | Sela ....................... A21C 9/086 198/493 |
| 4,789,055 | A | | 12/1988 | Steurmer |
| 5,088,912 | A | | 2/1992 | Raque et al. |
| 5,271,709 | A | | 12/1993 | VanderMeer et al. |
| 5,339,942 | A | | 8/1994 | Gasser et al. |
| 6,332,749 | B1 | | 12/2001 | Garcia-Balleza et al. |
| 7,413,070 | B2 | * | 8/2008 | Mayer ................... B65G 47/715 |
| 2006/0131131 | A1 | | 6/2006 | Mayer |

FOREIGN PATENT DOCUMENTS

| | | |
|---|---|---|
| EP | 1472162 A1 | 11/2004 |
| WO | 03057602 A1 | 7/2003 |
| WO | 2007050146 A1 | 5/2007 |

\* cited by examiner

METHOD AND APPARATUS FOR THE GROUPED ARRANGEMENT, ORIENTATION AND PACKAGING OF INDIVIDUAL FOOD PRODUCTS SUCH AS PATTY STACKS

CROSS REFERENCE TO RELATED APPLICATION

This application claims the priority of German Patent Application No. 10 2017 120 823.2, filed on Sep. 8, 2017 (pending), the disclosure of which is incorporated by reference herein in its entirety.

TECHNICAL FIELD

The invention relates to a method and apparatus for the grouped arrangement, orientation and packaging of individual food products such as patty stacks.

BACKGROUND

Some methods and apparatuses for the grouped arrangement of food products are known in the state of the art. The food products can be, for example, patties. The term patty is used to denote a meatball or rissole or a shaped product of meat and/or vegetarian constituents, for example, as used for burgers.

One conventional apparatus and method are known from EP 1 472 162. Individual product portions are conveyed by a so-called lining-up belt and transferred at a transfer edge to a so-called portioning belt on which the portions can be deposited in various formats. After deposit the products can be deposited in one or more packages. This machine and method are complex and subject to a plurality of potential failure modes.

In general, a difficulty persists in this field, related to placing the food products on a feed or conveyor belt as accurately as possible and positioning them in a precise arrangement.

SUMMARY

One object of the invention described herein is to provide a method and an apparatus with which food products, in particular stacked products such as patty stacks, can be deposited positioned as well as possible in groups on a feed or conveyor belt. According to a further aspect, the present invention in one embodiment provides a method and an apparatus with which food products, in particular stacked food products, subsequently to being arranged on a belt can then be transferred into a packaging. Another object of the invention is to provide a method and an apparatus with which a plurality of rows of stacked products, in particular patty stacks, can be grouped and introduced as a group into a prepared packaging, in particular receptacle nests of a deep-drawing arrangement, wherein preferably the rows are in closely adjoining relationship and there is sufficient space for insertion into the packaging, in particular prepared nests.

In another embodiment, the method according to the invention and the apparatus according to the present invention provide that individual products, in particular stacked products like patty stacks, can be positioned in particularly well oriented relationship in groups in various formats on a transport belt, according to the invention the so-called second feed belt. The oriented products can then be transported to a packaging by the feed belt. By the orientation mask according to the invention which preferably has compartments in the form of recesses the products, in particular product stacks, are arranged precisely on the second feed belt.

According to some embodiments of the method of the present invention the second feed belt preferably performs a transport movement, preferably a short rearward movement, to transport the product stacks previously ejected on to the feed belt in the direction of and into contact with the orientation mask. By bringing the product stacks into contact with the mask, preferably by a short rearward movement, the products or product stacks are oriented in one or even two directions, in the X-direction and/or the Y-direction in a coordinate system. The term rearward movement is used to denote a movement, produced by the second feed belt, of the products in the Y-direction in opposite relationship to the subsequent transport direction, for further processing or for packaging of the products, in particular therefore a movement away from a packaging machine.

For that purpose, the orientation mask according to these embodiments of the present invention can have compartments, preferably a plurality of compartments of various given shapes. Preferably the compartments are substantially of a U-shaped or V-shaped configuration or a shape which narrows from the outside inwardly—like a bay or indentation. By the transport movement of the second transport belt the patties are particularly advantageously oriented in the narrowing shape of the compartments, firstly in the one direction, by the narrowing sides or walls, and finally, by coming to bear against the orientation mask also in a further direction—accordingly being oriented in the X- and Y-directions. The products which are oriented in that way and stacked one upon the other can then be further transported, preferably in the opposite direction, to a packaging or a packaging device.

An advantageous development of the method according to embodiments of the present invention comprises the steps successively feeding a plurality of in particular stacked products by the first feed belt, ejecting the plurality of products on the second feed belt at a plurality of different X-positions on the X-axis in adjacent relationship to the orientation mask which has a plurality of compartments, which are respectively arranged at various X-positions along the X-axis or an axis parallel thereto so that the ejected products form a row of a plurality of products on the second feed belt, briefly transporting the plurality of products by the second feed belt along the Y-axis in the direction of the orientation mask so that the products at least partially come into contact with the orientation mask and are at least partially oriented with respect to the X-axis and/or the Y-axis on the second feed belt, and further transporting the oriented products in the direction of the Y-axis, preferably with a change in the direction of movement of the second feed belt.

In another aspect, the method provides that a plurality of in particular stacked products are successively ejected into a respective U-shaped or V-shaped compartment of the orientation mask so that the stacked products are arranged at a preferably small spacing relative to each other and form a row on the second feed belt, brief rearward movement of the row of stacked products in the direction of the orientation mask whereby the stacked products are moved into the rounded configuration of the U-shaped compartments to be oriented in accurately positioned relationship there, brief forward movement of the oriented row of stacked products, forming a further row of stacked products by successive ejection into the compartments of the orientation mask, renewed brief rearward movement of the products in the direction of the orientation mask, more specifically until the first previously oriented row of products has moved against the further also oriented row of products so that the two rows are substantially without a spacing relative to each other, optionally forming a further row of stacked products on the second feed belt and orienting and adjacently arranging the further row at the rows already previously arranged in closely adjoining relationship, and then displacing an oriented group of a plurality of stacked products. In particular, groups of products, in particular product stacks, can advantageously be formed on the second feed belt. A group comprises a plurality of stacked products which involve a plurality of rows which are arranged in mutually closely adjoining relationship, for example a 3×4 or 2×4 group or a group of a different composition, comprising a plurality of rows each having a plurality of adjacent stacked products, wherein the stacked products in a row are spaced while rows of stacked products are in closely adjoining relationship.

Advantageously, the method also provides that a group comprising a plurality of patty stacks is formed along the X-axis and a plurality of patty stacks is formed along the Y-axis, then feeding the group of stacked products to a packaging by the second feed belt in the direction of the Y-axis and depositing the group of stacked products in a packaging. The resulting groups of products can be fed by further transport by the feed belt to a packaging, preferably a deep-drawn film packaging. For that purpose, a packaging device is preferably afforded having product-receiving nests. After formation of a desired group in a desired format and deposit in a packaging the above-described cycle for forming the group can be repeated as often as may be desired, using the orientation mask according to the invention.

Another advantageous development of the apparatus according to embodiments of the present invention provides that the orientation mask has a plurality of compartments which are preferably in the form of recesses and are arranged in mutually adjacent relationship and/or are preferably arranged in a row along an axis, in particular the X-axis. Thus, a plurality of products, in particular stacked products, can be arranged and oriented in a row so that the individual stacked products are at a spacing relative to each other. The stacked products can preferably be inserted into the compartments by the first feed belt. The shape of the compartments is preferably a shape which narrows from the outside inwardly, in particular a U-shaped configuration or a V-shaped configuration, in a plan view.

According to one preferred embodiment, it is provided that the orientation mask is of such a height that products, in particular stacked products, which are ejected by the first feed belt into a compartment of the orientation mask, at least partially hit against a wall of a compartment and can be brought into contact therewith. The orientation mask is preferred in terms of production engineering and is particularly robust if it has a plurality of compartments provided in a solid material, in particular plastic or metal.

It is proposed that the orientation mask is arranged by a holding device on a frame structure, in particular of the feed belt, and is preferably releasably fixed, which is advantageously so adapted that the orientation mask can be fixed in a plurality of positions in the direction of the X-axis and/or the Y-axis.

Additionally, in accordance with a further preferred embodiment, a development of the apparatus provides an electronic control device which is designed and adapted to control drives of the first and second feed belts in such a way that a plurality of different groups of products can be formed on the second feed belt and transported into the packaging.

Further advantages for the embodiments of the present invention are set forth hereinafter in the following sections of the present application.

BRIEF DESCRIPTION OF THE DRAWINGS

Further features and advantages of the present invention will be evident from the following description, in which embodiments are described in more detail with reference to schematic drawings, in which.

DETAILED DESCRIPTION

Figure 1:
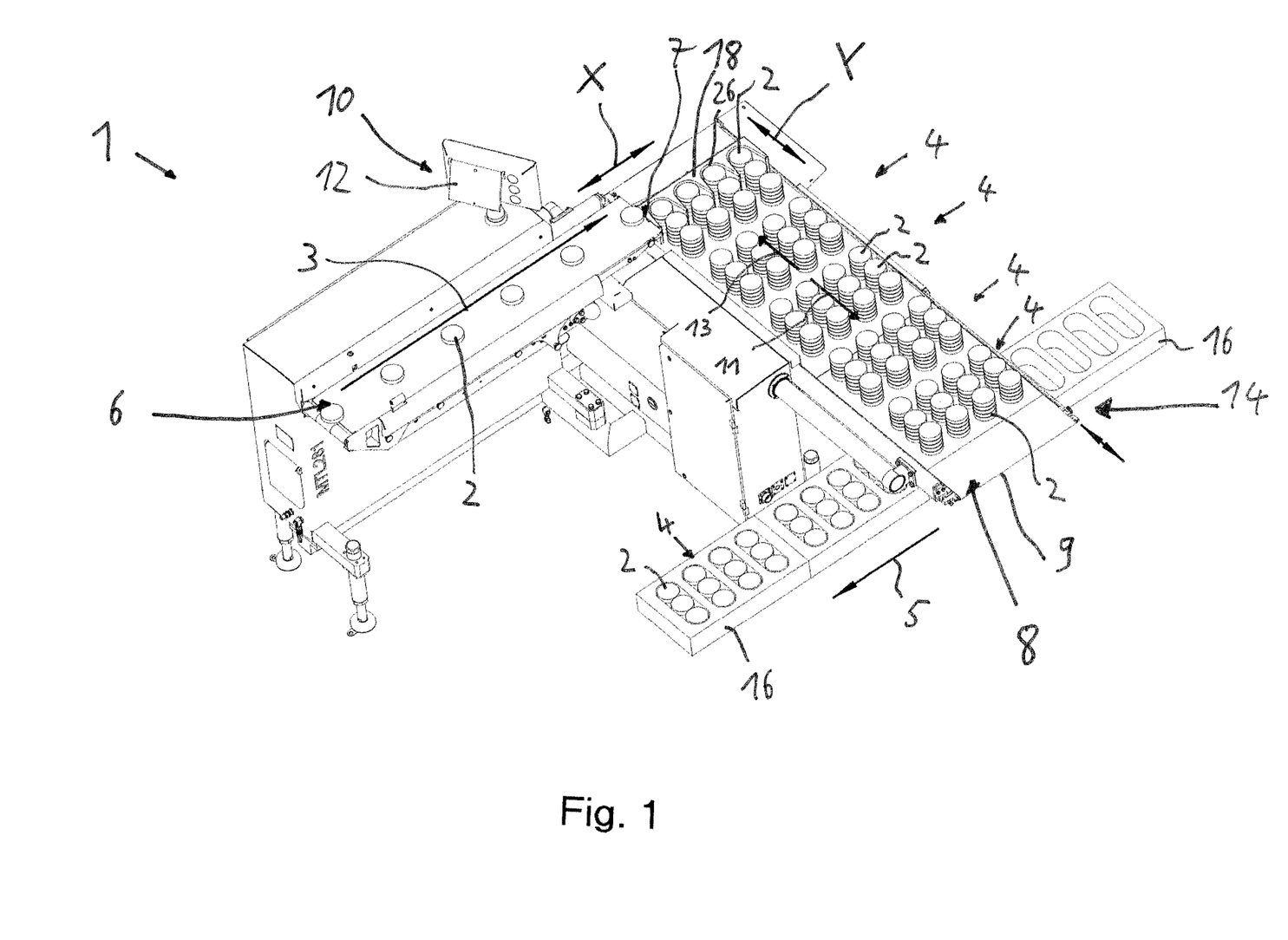
FIG. 1 is a front perspective view of one embodiment of an apparatus according to the present invention for the grouped arrangement, orientation and packaging of food products such as patty stacks, and for carrying out a method according to the present invention, with the apparatus shown in operation with moving patty stacks.

The apparatus 1 shown in FIG. 1 serves for the arrangement and orientation and grouping of stacked products 2, in particular patty stacks, in groups 4. The apparatus 1 includes—in addition to further components—a first feed belt 6 for transporting the products in the direction of a first X-axis and a second feed belt 8 for transporting the products in the direction of a second Y-axis. In this embodiment the X-axis and the Y-axis are preferably arranged at a right angle to each other; other angle arrangements of the axes and the feed belts 6, 8 relative to each other are also possible. The first feed belt 6 could also be referred to as an X-shuttle belt and the second feed belt 8 as a Y-shuttle belt.

The first feed belt 6 and the second feed belt 8 are each part of a per se known belt conveyor device having a motor-driven circulating endless belt and are each in the form of a retraction belt, which, as is known to the man skilled in the art, signifies that the end which is the rear end as viewed in the transport or conveyor direction of the respective feed belt 6, 8, can be moved forward and back in the respective conveyor direction in order to vary the effective length of the belt and to be able to eject the product 2 or a group of products 4 from the belt at various locations. For that purpose, besides the endless belt, the feed belts 6 and 8 have a retraction device which is also motor-driven, and which provides that the location of the rear ejection edge 7 and 9 respectively at the end of the conveyor belts 6, 8 can be varied. The feed belts 6, 8 are mounted in known manner to machine frame structures.

The entire apparatus 1, in particular also the feed belts 6, 8, can be controlled by a control device 10 which has a monitor 12 and in a manner not shown here operating devices, electronic memories, a computer as well as sensors and connections and lines, in respect for example of the conveyor speed, the conveyor direction and the respective effective length by a variation in the location of the rear ejection edge 7 and 9 respectively at the end of the conveyor belts 6, 8.

A packaging machine 14 in the form of a so-called deep-drawing machine, referred for simplicity as a deep-drawer, is provided beneath the end region of the second feed belt 8 in such a way that products 2, in particular groups 4 of products, can be discharged into a packaging 16, in particular a deep-drawn packaging. For that purpose, the packaging machine 14 has in known fashion a device for feeding empty packaging 16 with for example a plurality of so-called receptacle nests, which are arranged in a desired arrangement, in particular for receiving a group 4 of stacked products 2, as well as associated drives, devices for feeding trays, film packaging's and optionally a vacuum device.

Stacked products 2 can be transported by the feed belt 6 in the X-direction (arrow 3), in the Y-direction by the second conveyor belt 8 in the direction of the packaging machine 14 and by the same finally in the X-direction in the direction of the arrow 5.

Figure 2:
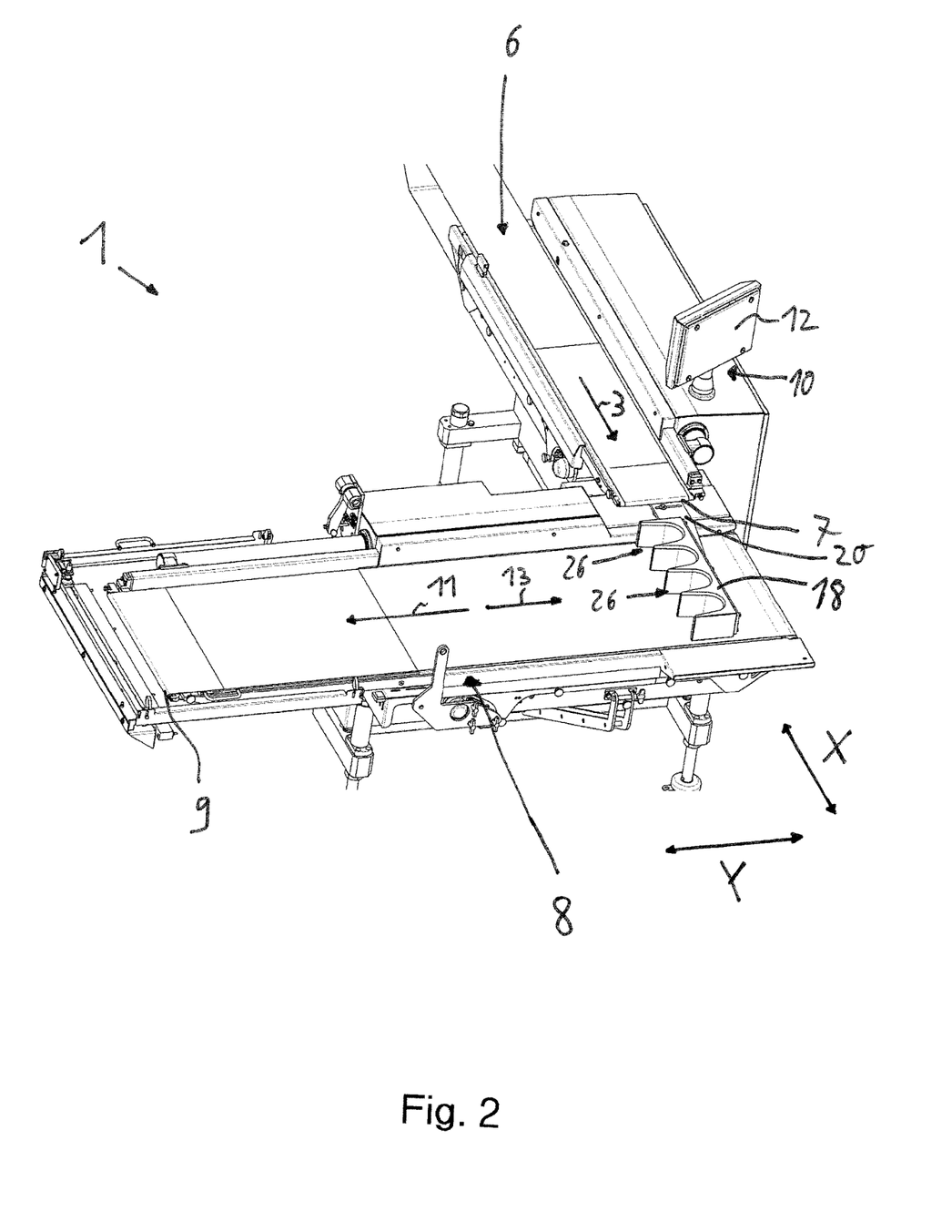
FIG. 2 is a rear perspective view of a portion of the apparatus of FIG. 1, without the patty stacks to reveal additional features.

As FIG. 2 shows the first feed belt 6 for feeding the products 2 in the X-direction is arranged substantially laterally of and above the second feed belt 8 so that products, in particular patty stacks, can be ejected on to the second feed belt 8. In that respect the specific trajectory depends in particular on the speed of the feed belt 6 in the X-direction and the difference in height between the feed belts 6, 8. By virtue of the feed belt 6 being in the form of a retraction belt the products 2 can be ejected at various positions in the X-Y coordinate system at various X-positions, and can thus be deposited on the second feed belt 8 at various locations. Depending on the respective effective length and position of the ejection edge 7 the products 2 come to lie in different X-positions, transversely to the direction along the Y-axis, on the conveyor belt 8.

An orientation apparatus according to the invention in the form of an orientation mask 18 is arranged above the second feed belt 8 and serves for orientation of the products 2, in particular stacked products 2, on the second feed belt 8. Desirably the orientation mask 18 is disposed beneath the first feed belt 6 and thus also beneath the ejection edge 7 which is displaceable in the X-direction, and preferably as a prolongation of the conveyor path in the direction of the first feed belt 6.

Figure 3:
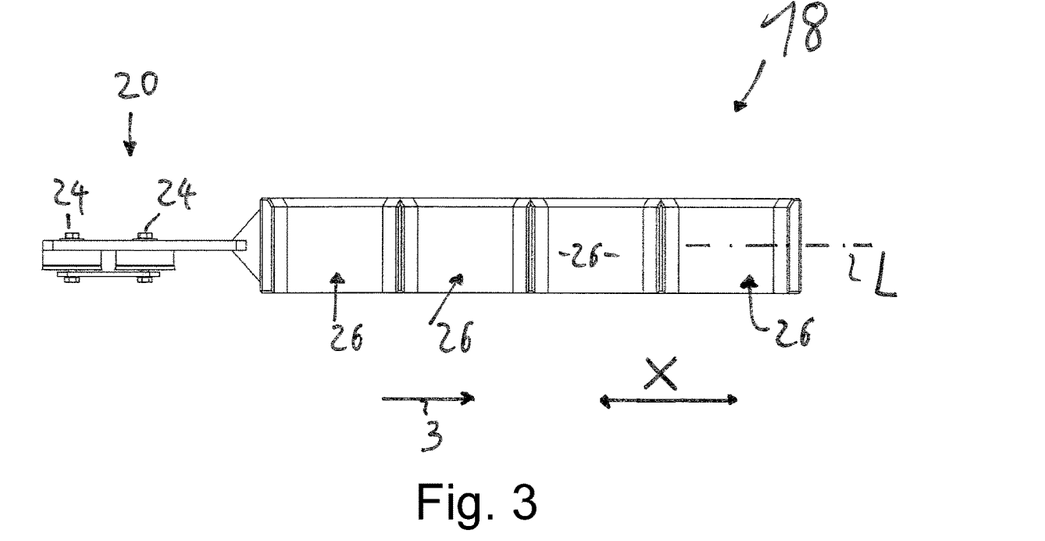
FIG. 3 is a side view of one embodiment of an orientation mask having a plurality of compartments, for use with the apparatus of FIG. 1.
Figure 4:
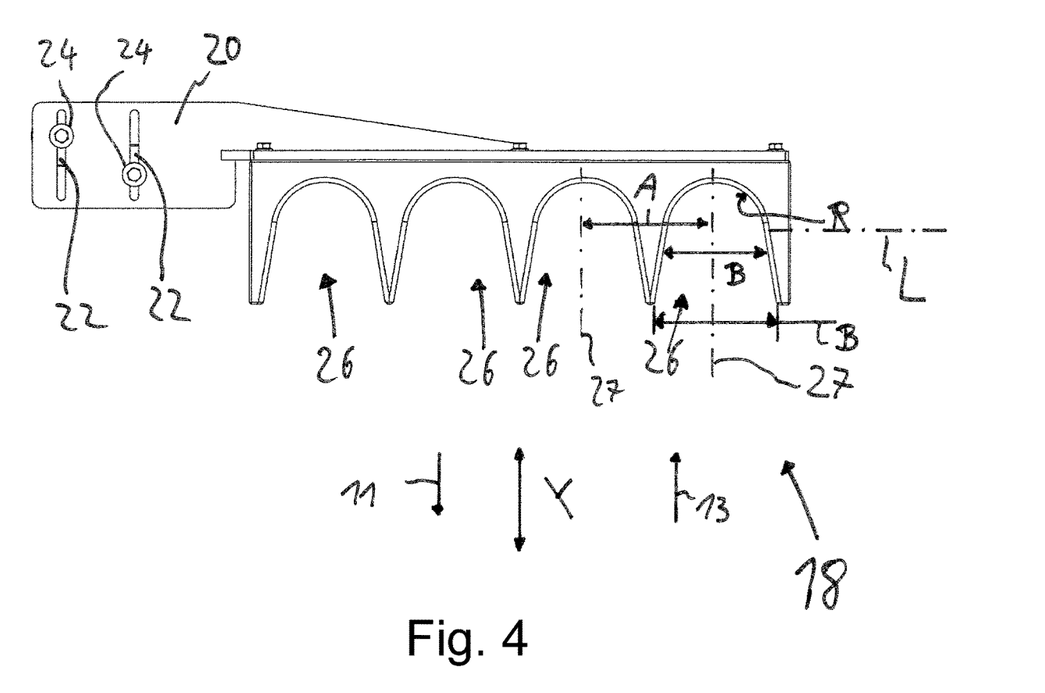
FIG. 4 is a top plan view of the orientation mask of FIG. 3.

In the illustrated embodiment the orientation mask 18 is positioned stationary and rigidly by a holding device 20, by mounting thereof to a machine frame structure or a part of the first or second feed belts 6, 8. In a manner not shown here however the orientation mask 18 could alternatively also be adapted to be moveable and could be arranged at another location above the second feed belt 8, for example also in such a way that it is adapted to be moveable into and out of the path of movement of the products 2 on the second feed belt 8, in particular being motor-driven, so that in that way it can be moved out of an active orientation position into a passive position and vice-versa. As FIGS. 2 through 4 show the holding device 20 is screwed with a part to the orientation mask 18 or fixed in some other fashion and on the other hand is screwed by a screw connection 24 to the machine frame structure of the first feed belt 6. For that purpose, the holding device 20 is in the form of a flat body, for example made from sheet metal, and is provided with slots 22 or bores to be able to pass screws therethrough and fix same.

The orientation mask 18 has a plurality of compartments 26, in the illustrated embodiment four compartments, which are so adapted that a respective compartment 26 can receive at least one product 2, in particular a plurality of stacked products 2, in particular a respective patty stack, so that stacked products 2 can be discharged from the first feed belt 6 by respectively appropriate positioning of the ejection edge 7 into a compartment 26 or in relation to a compartment 26, that to say in the embodiment it can be ejected into the compartment. In the illustrated embodiment the compartments 26 are in the form of recesses which narrow from the outside inwardly, particularly preferably as can be seen from a plan view (FIG. 4), of a U-shaped configuration or a V-shaped configuration (not shown) or the like.

As in particular FIGS. 3 and 4 clearly show a compartment 26 (or the compartments 26) narrow from the outside inwardly, therefore viewed in the Y-direction, more precisely in the direction of the arrow 13. A compartment 26 is approximately in the shape of bay and is preferably of a substantially symmetrical configuration, with respect to a center line 27 arranged parallel to the Y-axis. The width B of a compartment 26, see FIG. 4, is therefore at a maximum in the outer region and decreases as it further progresses inwardly into the compartment 26. In the illustrated embodiment a compartment 26 firstly narrows uniformly—moving further inwardly—and the walls in that region are substantially flat and oppositely disposed walls are arranged inclinedly relative to each other. In an inner region the walls then go into a curved region, in the illustrated embodiment into a region R of a substantially cylindrical shape. There the wall therefore is of a given shape which is adapted to the shape of the products 2 or to the shape of a plurality of mutually stacked products 2, in particular stacked patties. In the embodiment therefore, the cylindrical region R is of a given radius. Alternatively, however other radii and shapes are also possible, for example shapes other than a cylindrical shape are possible in the region R, for example shapes involving a different curvature, for example elliptical. The center-to-center spacing A of two adjacent compartments 26 corresponds to the spacing of the center lines 27. The spacing of the orientated products 2 on the second feed belt 8 is substantially established by that center-to-center spacing A. The orientation mask 18 has a longitudinal axis L extending in the X-direction, see FIGS. 3 and 4. The compartments 26 form a row in the direction of the longitudinal axis L.

The recesses forming the compartments 26 are afforded in a solid material of preferably plastic or metal, preferably a plastic like for example PTFE (such as Teflon®). Alternatively, the orientation mask 18 could be in the form of a grid structure having a plurality of compartments 26 which are formed therein for receiving stacked products 2.

As FIG. 1 shows four preferably stacked products 2 can be arranged in the four compartments 26 of the orientation mask and can be oriented therewith (as will be further described herein). The product 2 can thus be arranged in the orientation mask in a row or succession of four; the number of compartments 26 in the orientation mask 18 can be varied as desired.

The orientation mask 18 is of such a height that products, in particular stacked products 2, which are ejected by the first feed belt 6 into a compartment 26 of the orientation mask 18, can at least partly hit against a wall of a compartment 26 and can be brought into contact therewith or is of such a height that the orientation mask corresponds at least to the height of the stacked products 2. At the same time the size of the compartments 26 is matched to the shape of the products 2 and is preferably somewhat larger than same. By the preferably narrowing shape of the compartments 26 the products 2 fill the compartments 26 to a greater or lesser degree depending on the respective position relative to the orientation mask 18, see FIG. 1. The compartments 26 are preferably of the same center-to-center spacing as the shaping nests of the deep-drawing machine. The configuration of the U-shaped compartments 26 narrows inwardly or enlarges outwardly. A product 2 or patty stack is inserted into the enlarged outer region so that as far as possible it does not hit against the wall of the compartment 26 or does so only to a minimum extent. In a manner not shown here the orientation mask 18 can be positioned by the holding device 20 at various X- and Y-positions on the machine frame structure or the feed belts 6, 8, according to the respective situation of use.

The method according to the invention and the apparatus 1 and the mode of operation thereof together with a packaging machine 14, preferably a deep-drawing machine, is further described hereinafter:

The method is described hereinafter by reference to the arrangement and orientation of stacked products 2, in particular a patty stack, but other or even non-stacked individual food products could also be arranged, oriented and packaged according to the invention.

Also, with reference to FIGS. 5A through 5J showing the method procedure in a series of ten steps, and with reference to FIGS. 6A through 6I, a first in particular stacked product 2 is transported and fed by the first feed belt 6 in the X-direction in the direction of the arrow 3.

Figure 5A:
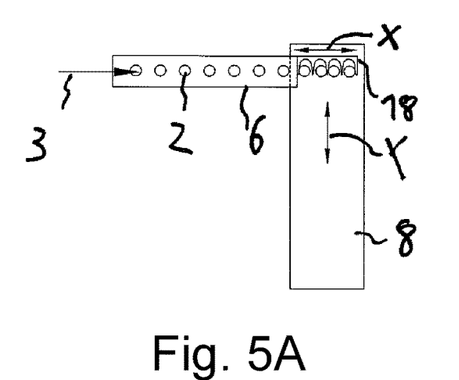
FIG. 5A shows a first step of one embodiment of a method according to the present invention for the grouped arrangement and orientation of food products such as patty stacks, using the orientation mask and the apparatus of FIGS. 1 through 4.
Figure 5B:
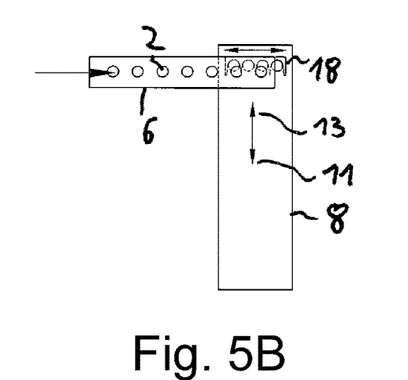
FIG. 5B shows a second step of the method of FIG. 5A.

In step 1 the stacked product 2 is then ejected into a compartment 26 of the orientation mask 18, more specifically into the outer front wider region of a compartment 26. Alternatively, the product 2 could also be ejected on to the second feed belt 8 in front of a compartment 26, as viewed in the Y-direction. By renewed feed of a further stacked product 2, a further product 2 is associated with a compartment 26. In the illustrated embodiment the compartment 26 is filled in the outer region thereof, then a further compartment 26, and finally the fourth compartment 26. Preferably, the rearmost compartment 26 is filled first, with respect to the conveyor direction 3, and then the further compartments 26 are successively filled by retracting the ejection edge 7. The products 2 are therefore ejected on to and deposited on the second feed belt 8 at respectively different positions on the X-axis. After ejection the stacked products 2 are not necessarily in their precise position, for which reason they are oriented by the orientation mask 18, as is described in greater detail hereinafter.

In a further step (step 2) the previously ejected product or products 2 is or are transported along the Y-axis in the direction of the orientation mask 18 by switching on and accelerating the second feed belt 8 and is or are thus transported or moved into the compartments 26 of the orientation mask 18 in order there to orient the products 2. In the illustrated embodiment that transport is caused by a movement in the direction of the arrow 13, by a rearward movement, see also the further description hereinafter in that respect. Orientation is generated based on the narrowing shape of the compartments 26 or the walls or boundary surfaces thereof. The products 2, in particular the stacked products, are thus preferably oriented on the one hand in the Y-direction as in the ideal situation they come to bear against the deepest point of the compartments 26, or however also by the lateral walls, and/or are oriented in the X-direction by the narrowing shape. The orientation mask 18, in particular the compartments 26, are of such a configuration that the stacked products 2 are arranged as uniformly spaced as possible relative to each other in a row in the X-direction on the second feed belt 8. In the illustrated embodiment the orientation transportation movement is caused by brief (rearward) movement in the Y-direction away from the packaging machine 14 in the direction towards the orientation mask 18; in that respect a rearward movement is caused. The term rearward movement is used to denote a movement of the products, produced by the second feed belt, in the Y-direction in opposite relationship to the following transport direction for further processing or for packaging of the products, in particular therefore a movement away from a packaging machine 14. The term forward movement is used to denote a movement or transport in the other direction along the Y-axis, in the direction towards further processing or towards a packaging machine 14. The forward movement is indicated by the arrow 11, for example in FIG. 1, 2, 4 or 5, the rearward movement being denoted by the arrow 13.

Figure 5C:
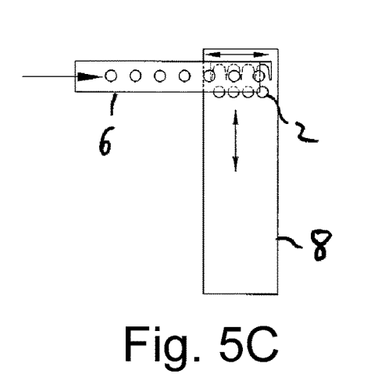
FIG. 5C shows a third step of the method of FIG. 5A.

The products 2 oriented in that way are then further transported by the second feed belt 8 in the direction of the Y-axis, with a change in the previous direction of movement, now in a forward movement in the direction of the packaging machine 14 away from the orientation mask 18, see step 3. The oriented products which are in a row and which are at a certain spacing from each other of for example between 1 and 4 cm, depending on the respective dimensioning of the orientation mask 18, are therefore transported a distance in the Y-direction by the second feed belt 8.

Figure 5D:
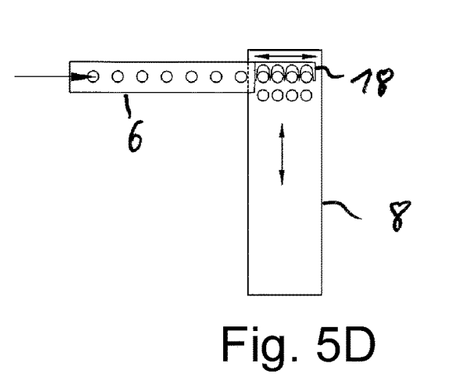
FIG. 5D shows a fourth step of the method of FIG. 5A.

The second transport belt 8 is then temporarily stopped. In that condition, in accordance with step 4, repeated fresh filling of the compartments 26 of the orientation mask 18 is implemented, as described hereinbefore in respect of step 1, or an association of the products 2 in front of the compartments 26 as viewed in the Y-direction takes place. The next row of four products 2 is thus formed.

Figure 5E:
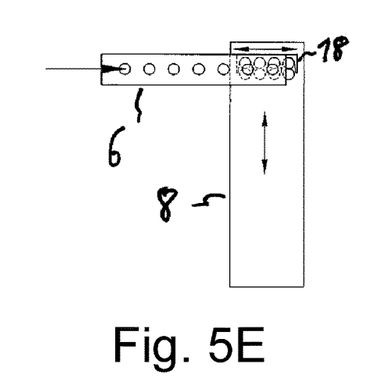
FIG. 5E shows a fifth step of the method of FIG. 5A.

In a next step 5 the second feed belt 8 is switched on for a short return stroke, a short rearward movement in the direction (of the arrow 13) towards the orientation mask 18 so that the second row of products 2 is oriented by the orientation mask in the X- and Y-directions. The rearward movement is preferably carried out in such a way that at the same time orientation is caused and the previously oriented first row of products is moved close to the second row of four products 2 so that the respectively adjacent stacked products 2 are arranged close together and possibly come into contact. The first row of four is therefore pushed against the second row of four; the row of four which is produced secondly is oriented at the same time.

Figure 5F:
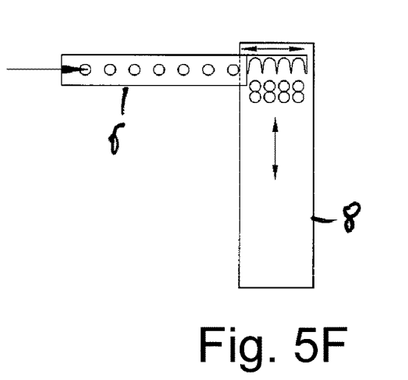
FIG. 5F shows a sixth step of the method of FIG. 5A.

In accordance with step 6 the two adjacent produced rows of products are then transported by the second feed belt in the Y-direction towards the packaging machine 14 (in the direction of the arrow 11). The orientation mask 18 is/becomes therefore free again with its compartments 26.

Figure 5G:
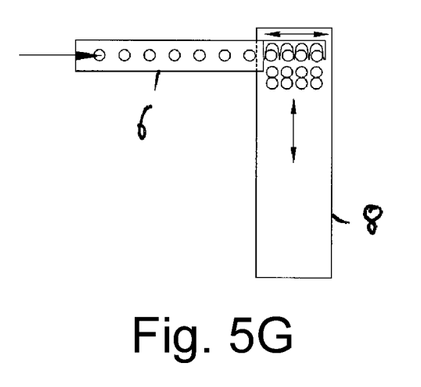
FIG. 5G shows a seventh step of the method of FIG. 5A.
Figure 5H:
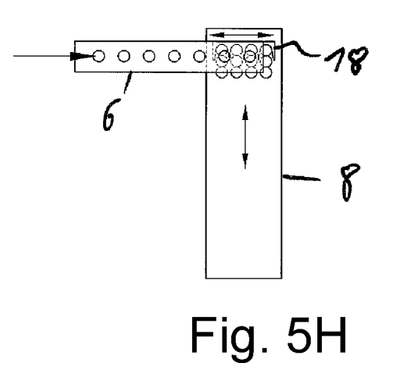
FIG. 5H shows an eighth step of the method of FIG. 5A.

In accordance with step 7 the compartments 26 of the orientation mask 18 are again filled with individual stacked products 2 by the first feed belt 6.

In step 8 the second transport belt 8 is again switched on and the row last formed within the compartments 26 of the orientation mask 18 is oriented by the short rearward movement (in the direction of the arrow 13). At the same time the two rows of previously oriented stacked products 2 are moved in the Y-direction towards the last-oriented row of products 2 until they are arranged close together and possibly also contact each other. Now therefore a group 4 comprising three rows which are arranged close together, with somewhat spaced stacked products 2, is formed on the second feed belt 8. That group 4 can be clearly seen in FIG. 5I, but also as a group consisting of a total of twelve stacked products 2 in FIG. 1.

Figure 5I:
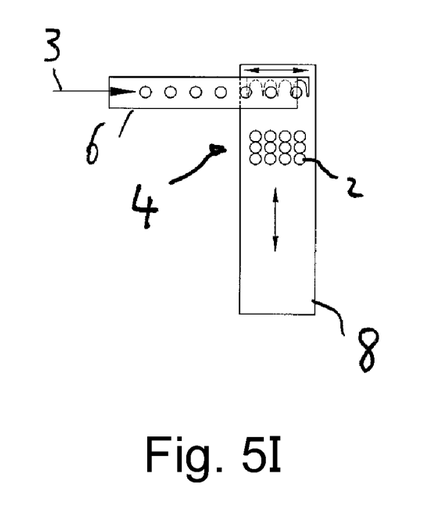
FIG. 5I shows a ninth step of the method of FIG. 5A.
Figure 5J:
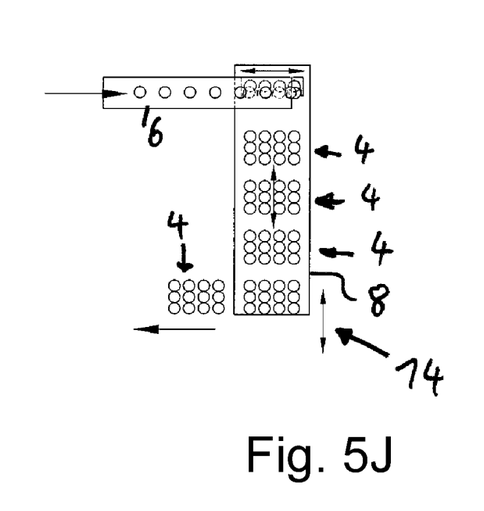
FIG. 5J shows a tenth step of the method of FIG. 5A.
Figure 6A:
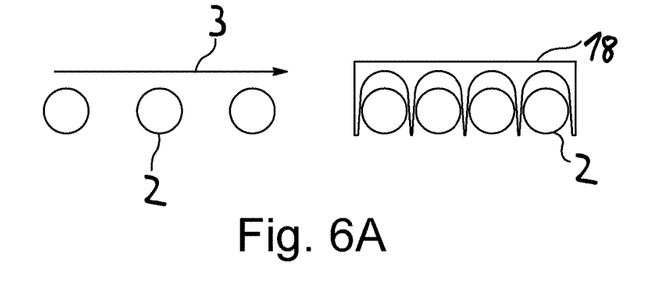
FIG. 6A shows a first step of another embodiment of a method according to the present invention for the grouped arrangement and orientation of food products.
Figure 6B:
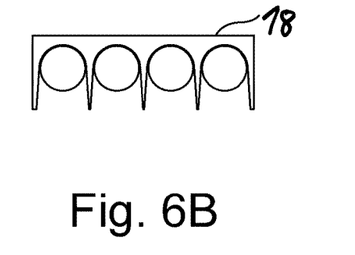
FIG. 6B shows a second step of the method of FIG. 6A.
Figure 6C:
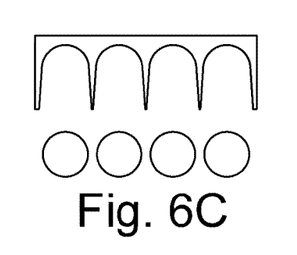
FIG. 6C shows a third step of the method of FIG. 6A.
Figure 6D:
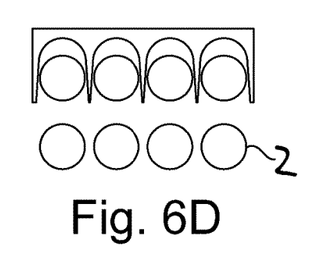
FIG. 6D shows a fourth step of the method of FIG. 6A.
Figure 6E:
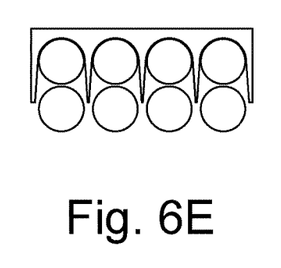
FIG. 6E shows a fifth step of the method of FIG. 6A.
Figure 6F:
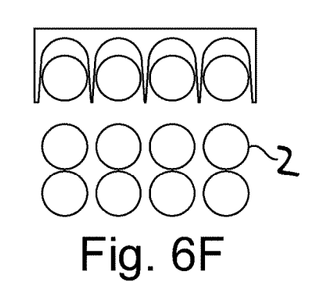
FIG. 6F shows a sixth step of the method of FIG. 6A.
Figure 6G:
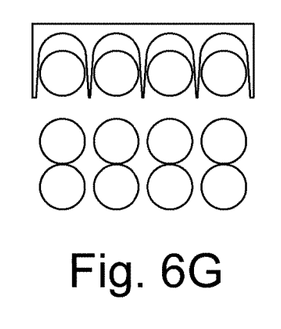
FIG. 6G shows a seventh step of the method of FIG. 6A.
Figure 6H:
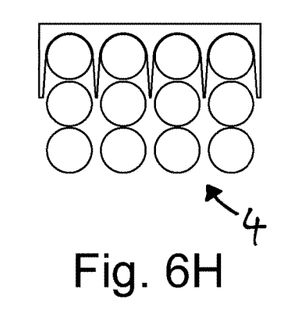
FIG. 6H shows an eighth step of the method of FIG. 6A.
Figure 6I:
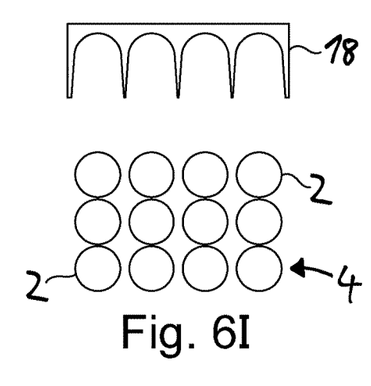
FIG. 6I shows a ninth step of the method of FIG. 6A.

The above-described process of forming individual rows of products 2 and orientation with the orientation mask as well as the formation of adjacent rows which can form a group 4, for example a 3×4 group, can then be repeated as often as may be desired, as shown at step 9 and step 10 respectively.

In a manner not shown here, instead of a row comprising four stacked products, it is also possible to arranged three, five or any other number of products in a row. Equally, in a fashion not shown here, a group can be formed from two, three, four or many rows.

A group which has been formed, for example the illustrated 4×3 group 4, is then transported in the Y-direction by the second feed belt 8 (in the direction of the arrow 11) to the packaging machine 14 above the packaging 16, a deep-drawn packaging. By retraction of the ejection edge 9 of the second feed belt 8 the previously oriented products of a group 4, in the example the 4×3 group, drop into the packaging 16, more precisely the receptacle nests of the deep-drawn packaging. Therefore, the entire group 4 is deposited in a packaging 16 by a return stroke of the ejection edge 9.

According to the invention therefore it is possible to form any formats of grouped products, in particular stacked products 2. The products 2 which are oriented by the orientation mask 18 are somewhat spaced from each other while the implementation of the method makes it possible to move the respectively adjacent rows close together; alternatively, however they can also be disposed at a certain spacing relative to each other, depending on which specific format is wanted in the packaging 16.

The contents described in the embodiments of the specification are merely used for particularizing the implementation forms of the present invention. The protection scope of the present invention should not be regarded as being merely limited to the specific forms stated in the embodiments, and the protection scope of the invention also includes equivalent technical means conceivable by those skilled in the art according to the aspects of the present invention.

What is claimed is:

1. A method for the grouped arrangement and orientation of individual food products, the method comprising:

feeding a food product by a first feed belt for transporting the food product in the direction of a first X-axis, ejecting the food product from the first feed belt at a position on the X-axis on to a second feed belt for transporting the food product in the direction of a second Y-axis which is arranged at an angle of substantially 90° relative to the X-axis, transporting the food product by the second feed belt along the Y-axis in the direction of an orientation mask which is arranged above the second feed belt and which is so designed and adapted that the food product contacts the orientation mask and is at least partially oriented with respect to at least one of the X-axis and the Y-axis on the second feed belt, and further transporting the oriented food product by the second feed belt in the direction of the Y-axis.

2. The method of claim 1, wherein the food products include stacked products, and the method comprises:

successively feeding a plurality of the food products by the first feed belt, ejecting the plurality of food products onto the second feed belt to form a plurality of stacked products at a plurality of different X-positions on the X-axis in adjacent relationship to the orientation mask which has a plurality of compartments, which are respectively arranged at various X-positions along the X-axis so that the ejected plurality of stacked products form a row on the second feed belt, transporting the plurality of stacked products by the second feed belt along the Y-axis in the direction of the orientation mask so that the plurality of stacked products at least partially contacts the orientation mask and is at least partially oriented with respect to at least one of the X-axis and the Y-axis on the second feed belt, and further transporting the oriented plurality of stacked products by the second feed belt in the direction of the Y-axis.

3. The method of claim 2, wherein the steps of transporting the plurality of stacked products by the second feed belt are defined by a rearward movement in the direction of the orientation mask and subsequently thereto a forward movement in the opposite direction and in the direction of the Y-axis.

4. The method of claim 2, wherein:

the plurality of stacked products is successively ejected into a respective U-shaped compartment of the orientation mask so that the plurality of stacked products is arranged at a spacing relative to each other and form a first row on the second feed belt, the second feed belt produces a rearward movement of the first row of stacked products in the direction of the orientation mask whereby the stacked products are moved into a rounded configuration of the U-shaped compartments to be oriented in accurately positioned relationship, the second feed belt produces a forward movement of the oriented first row of stacked products, the first feed belt ejects additional ones of the plurality of stacked products, forming a further row of stacked products, the second feed belt produces a rearward movement of the products in the direction of the orientation mask, more specifically until the oriented first row of products has moved against the further row of products so that the two rows are substantially without a spacing relative to each other, and the second feed belt displaces an oriented group defined by the rows of the plurality of stacked products.

5. The method of claim 4, wherein:
a first oriented group is produced from a plurality of closely spaced rows of the plurality of stacked products,
the second feed belt transports the first oriented group along the Y-axis, and
a further group of stacked products is produced from a plurality of closely spaced rows of the plurality of stacked products on the second feed belt and arranged at a spacing relative to the first oriented group on the second feed belt.

6. The method of claim 4, further comprising:
feeding the oriented group of stacked products to a packaging by the second feed belt in the direction of the Y-axis, and
depositing the oriented group of stacked products in a packaging.

7. An apparatus for the grouped arrangement and orientation of stacked food products, the apparatus comprising:
a first feed belt for feeding food products in a first direction of movement in the direction of an X-axis and for ejecting the food products on to a second feed belt to form stacked food products,
a second feed belt for feeding the stacked food products in a second direction of movement along a Y-axis which is arranged at an angle of substantially 90° relative to the X-axis, and
an orientation mask having a longitudinal axis L extending in the direction of the X-axis, which is arranged above the second feed belt and which is positioned such that the stacked food products can be introduced into at least one compartment of the orientation mask and thereby oriented on the second feed belt,
wherein the orientation mask has a plurality of compartments which are arranged in mutually adjacent relationship and form a row in the direction of longitudinal axis L.

8. The apparatus of claim 7, wherein the plurality of compartments of the orientation mask are recesses that are arranged in a row along the X-axis.

9. The apparatus of claim 7, wherein the plurality of compartments are of a shape which narrows from the outside inwardly to define at least one of a U-shaped configuration and a V-shaped configuration in a plan view.

10. The apparatus of claim 7, wherein the orientation mask defines a height such that the stacked food products at least partially hit against a wall of a compartment and can be brought into contact therewith.

11. The apparatus of claim 7, wherein the plurality of compartments are provided in a solid material.

12. The apparatus of claim 11, wherein the solid material includes at least one of plastic and metal.

13. The apparatus of claim 7, wherein the orientation mask is arranged by a holding device on a frame structure of the feed belt.

14. The apparatus of claim 13, wherein the holding device is adapted to releasably fix the orientation mask in a plurality of positions in the direction of at least one of the X-axis and the Y-axis.

15. The apparatus of claim 7, further comprising:
an electronic control device which is designed and adapted to control drives of the first and second feed belts in such a way that a plurality of different groups of products can be formed on the second feed belt and transported into a packaging.

16. An apparatus for the grouped arrangement and orientation of stacked food products, the apparatus comprising:
a first feed belt for feeding food products in a first direction of movement in the direction of an X-axis and for depositing the food products on to a second feed belt to form stacked food products,
a second feed belt for feeding the stacked food products in a second direction of movement along a Y-axis which is arranged at an angle of substantially 90° relative to the X-axis, and
an orientation mask which is arranged above the second feed belt and which is positioned such that the stacked food products can be introduced into at least one compartment of the orientation mask and thereby oriented on the second feed belt,
wherein the orientation mask has a plurality of compartments which are arranged in mutually adjacent relationship,
wherein the plurality of compartments of the orientation mask are recesses that are arranged in a row along the X-axis.

* * * * *